(12) United States Patent
Johnson

(10) Patent No.: US 6,499,108 B1
(45) Date of Patent: Dec. 24, 2002

(54) SECURE ELECTRONIC MAIL SYSTEM

(76) Inventor: R. Brent Johnson, 111 W. 5th St., Suite 300, Tulsa, OK (US) 74103

( * ) Notice: Subject to any disclaimer, the term of this patent is extended or adjusted under 35 U.S.C. 154(b) by 0 days.

(21) Appl. No.: 09/239,425

(22) Filed: Jan. 28, 1999

Related U.S. Application Data

(63) Continuation-in-part of application No. 08/892,982, filed on Jul. 15, 1997, now Pat. No. 5,970,149, which is a continuation-in-part of application No. 08/752,249, filed on Nov. 19, 1996, now abandoned.

(51) Int. Cl.$^7$ .............................................. H04L 9/00
(52) U.S. Cl. .................... 713/201; 713/184; 713/176; 380/28
(58) Field of Search ........................ 380/28; 713/201, 713/176, 184

(56) References Cited

U.S. PATENT DOCUMENTS

| | | | |
|---|---|---|---|
| 4,182,933 A | 1/1980 | Rosenblum | 179/1.5 |
| 4,310,720 A | 1/1982 | Check, Jr. | 178/22.08 |
| 4,430,728 A | 2/1984 | Beitel et al. | 364/900 |
| 4,531,023 A | 7/1985 | Levine | 179/2 |
| 4,578,531 A | 3/1986 | Everhart et al. | 178/22.08 |
| 4,763,351 A | 8/1988 | Lipscher et al. | 379/95 |
| 4,965,804 A | 10/1990 | Trbovich et al. | 380/21 |
| 5,179,695 A | 1/1993 | Derr et al. | 395/575 |
| 5,204,961 A | 4/1993 | Barlow | 395/725 |
| 5,237,677 A | 8/1993 | Hirosawa et al. | 395/575 |
| 5,347,578 A | 9/1994 | Duxbury | 380/4 |
| 5,416,842 A | 5/1995 | Aziz | 380/30 |
| 5,452,460 A | 9/1995 | Distelberg et al. | 395/700 |
| 5,537,554 A | 7/1996 | Motoyama | 395/280 |
| 5,550,984 A | 8/1996 | Gelb | 395/200 |
| 5,678,002 A | 10/1997 | Fawcett et al. | 395/183 |
| 5,708,655 A * | 1/1998 | Toth et al. | 370/313 |

FOREIGN PATENT DOCUMENTS

| | | | | |
|---|---|---|---|---|
| EP | 0474058 A2 | | 3/1992 | G06F/11/00 |
| FI | WO 99/03238 | * | 1/1999 | H04L/12/58 |

OTHER PUBLICATIONS

Andrew Tanenbaum, Computer Networks, Prentice Hall, pp. 643–670.*

* cited by examiner

Primary Examiner—Gail Hayes
Assistant Examiner—James Seal
(74) Attorney, Agent, or Firm—Head, Johnson & Kachigian

(57) ABSTRACT

A system and method for transferring messages securely over a computer network which includes the steps of inputting the message to be transmitted at a first device and then encrypting the message at the first device. An address for a dynamically addressed server is obtained and the first device is connected to the dynamically addressed server. The encrypted message is transmitted from the first device to the server and the message is received at the dynamically addressed server. The message is transmitted from the server to a second device and then the message is decrypted at the second device.

11 Claims, 8 Drawing Sheets

SECURE ELECTRONIC MAIL SYSTEM

REFERENCE TO APPLICATIONS

This application is a continuation-in-part of U.S. patent application Ser. No. 08/892,982 filed Jul. 15, 1997, now U.S. Pat. No. 5,970,149 and entitled "Combined Remote Access and Security System"; which is a continuation-in-part of U.S. patent application Ser. No. 08/752,249, filed Nov. 19, 1996, and entitled "Combined Remote Access and Security System" now abandonded.

REFERENCE TO MICROFICHE APPENDIX

This application is not referenced in any microfiche appendix.

BACKGROUND OF THE INVENTION

1. Field of the Invention

The present invention is directed to an apparatus and method for a secure electronic mail communication system. More particularly, the invention is directed for use in communicating over networks where secure information exchange is required. The invention has utility in applications such as person-to-person communication over network systems, communications over the Internet, interbusiness network communications where security is required, and the like.

2. Prior Art

The use of keys for secure communications is well known. Secure communication systems, as well as key systems, are shown in U.S. Pat. No. 4,182,933, issued to Rosenblum on Jan. 8, 1980, entitled "Secure Communication System With Remote Key Setting"; U.S. Pat. No. 4,310,720, issued to Check, Jr. on Jan. 12, 1982; entitled "Computer Accessing System"; U.S. Pat. No. 4,578,531, issued to Everhart et al., on Mar. 25, 1986, entitled "Encryption System Key Distribution Method and Apparatus"; U.S. Pat. No. 4,965,804, issued to Trbovich et al. on Oct. 23, 1990, entitled "Key Management for Encrypted Packet-Based Networks"; U.S. Pat. No. 5,204,961, issued to Barlow on Apr. 20, 1993, entitled "Computer Network Operating With Multi-Level Hierarchial Security With Selectable Common Trust Realms and Corresponding Security Protocols"; and U.S. Pat. No. 5,416,842, issued to Aziz on May 16, 1995 entitled "Method and Apparatus For Key-Management Scheme For Use With Internet Protocols At Site Firewalls".

U.S. Pat. No. 4,182,933, issued to Rosenblum on Jan. 8, 1980, discusses a "Secure Communication System With Remote Key Setting". The Rosenblum '933 patent describes a system wherein a first subscriber communicates with a key distribution center to get an updated key to initiate secure communications with a second subscriber. An overview of the system shows that the user dials a telephone number into the first subscribing unit. The first subscribing unit then places the telephone number into temporary memory storage. The first subscriber then retrieves its initial caller variable from memory and places it into a key generator. The first subscriber then retrieves the number of the key distribution center (KDC) from its memory and dials the number. Once a connection has been established the first subscriber sends its caller ID as well as the caller ID of the telephone number being called to the KDC. This information is not yet transmitted in a secure manner.

Once the KDC has received the information from the first subscriber, the KDC looks up the caller variable for both the first subscriber and for the telephone number being called. The KDC then generates a new caller variable for the first telephone number. The KDC then transmits the caller variable for the number being called, a new caller variable for the first subscriber, using a secure transmission controlled by the initial caller variable. If this transmission is successful, then the KDC will replace the old caller variable in its table format with a new caller variable and break the connection.

Once the first subscriber has received and deciphered the caller variable for the number to be called and its new key caller variable, it will replace the old and used initial caller variable key with the new caller variable key. The first subscriber will then send the key for the number to be called to the key generator, retrieve the telephone number to be called, and dial the telephone number. The first subscriber will then transmit any information input by the user to the second subscriber using the second subscriber key. The second subscriber will receive information that has been encoded with the second subscriber key and will decode the information and transfer it on to the second user. In an alternative embodiment, after the phone call between the first subscriber and second subscriber, the second subscriber will call and get a new key from the KDC. In this alternative embodiment, both the key for the first subscriber and for the second subscriber will be changed out on every telephone call.

U.S. Pat. No. 4,310,720, issued to Check, Jr. on Jan. 12, 1982 discloses a "Computer Accessing System". The specification discloses a method for communicating between an access unit and a computer. The user enters his password into an input device which is connected to an access unit. The access unit generates a pseudo random access key from the password that is entered. The access unit then sends the access unit number and the generated access key to the computer controller for access to the computer system. The computer controller receives the access unit number and access key. The computer controller then verifies the access unit number. If the access unit number is properly verified, the computer controller will then compare the access code to the expected access code listed in a table in the computer's memory. This expected access code is generated using a congruent pseudo-random decoding algorthym. If the access key code and the expected code match, then the computer controller will establish a link between the access unit and the computer.

The access unit and the computer will talk through an encoded communication system. Both the access unit and the computer will use a randomly generated encryption key for encoding and decoding the communication. This key is independently generated by both the access unit and the computer and is not transmitted over the access unit to computer link. After the termination of the call between the access unit and the computer, the computer will generate and store the next access key number for that particular access unit.

U.S. Pat. No. 4,578,531 issued to Everhart et al. on Mar. 25, 1986 discloses an "Encryption System Key Distribution Method and Apparatus". This system allows the secure method for communication between a terminal "A" and terminal "B" by using a remote key distribution center. An initial signal is sent from terminal "A" to terminal "B" to initiate the process of generating a secure communication line. Terminal "A" then generates a new call set up key in preparation for communication with the key distribution center, and a partial session key which will be transmitted through the key distribution center to terminal "B". Terminal "A" then updates its verification information in preparation for communication with the key distribution center. Terminal "A" then initiates the connection with the key distribution center to which it sends its terminal address and the terminal "B" address and an encrypted message including the two generated keys and the verification information. At this point, terminal "A" will wait for the processing by the key distribution center.

The key distribution center will read the address information from the signal sent from terminal "A" and use this to access a de-cryption key previously sent in communication with terminal "A". The message from terminal "A" will then be de-crypted and the verification information will be updated. The key distribution center will then generate a bidirectional asymmetric encryption/de-cryption key pair. The first part of this key pair will be sent to terminal "A", and the second part of the key pair will be sent to terminal "B". A similar communication will happen with terminal "B".

The message to terminal "A" will consist of a subsequent call key for the next communication with a KDC, a partial session key which it received from terminal "B", verification information, and two other variables "Y" and "Q". These five pieces of information will be encrypted using the call set up key for the present communication with terminal "A" and the information will be transmitted to terminal "A". A similar encrypted message will also be sent to terminal "B" from the KDC.

Terminal "A" will de-crypt the message from the KDC and verify that the information is correct. Terminal "A" will then store the new communication key for the next communication with the KDC, take down the channel to the KDC, and establish a communication channel with terminal "B". A similar process will happen at terminal "B". At this point, terminal "A" and "B" will be able to communicate securely using the partial keys that were exchanged through the KDC. Terminals "A" and "B" can then use a random number and the variables "Y" and "Q" to create a new key which may be used to communicate securely between terminals "A" and "B". By using the variables and a random number to generate a new communication key, a secure communication encryption message may be employed which cannot be known by any outsiders to terminal "A" and "B", including the KDC.

U.S. Pat. No. 4,965,804, issued to Trbovich et al., on Oct. 23, 1990, discloses a "Key Management For Encrypted Packet Based Networks". This method of key management uses a key distribution center for sending keys to remote locations so that a secure communication can be made. Specifically, the system is designed to be compatible with X.25 type packet switching networks. This compatibility requires a balanced transmission which is implemented by a transparent device between the source DTE and second YDTE. The source DTE sends a transmit request to the transparent device which responds with a dummy signal back to the source DTE. The transparent device then contacts the key management system and obtains a key. A similar key is sent to the transparent device for the second DTE. The transparent devices for the first DTE and the second DTE then establish a communication network with an encrypted signal transfer, and finally the source DTE talks to the second DTE through the transparent devices and the encrypted connection.

U.S. Pat. No. 5,204,961, issued to Barlow on Apr. 20, 1993, discloses a "Computer Network Rating With Multi-Level Hierarchial Security With Selectable Common Trust Realms and Corresponding Security Protocols". The invention involves a method for setting up network communications between two trusted computer systems. Each trusted computer has a common set of protocols for the protection of data contained therein. Thus, if a user for a trusted computer system attempts to send data to a non-trusted computer system, then the trusted computer system will stop the message transfer and will not allow the communication to occur. This system operates as a method for two trusted computers to talk over a network which is not physically secure against interlopers. Each computer that is a member of a specific trust realm enforces a predefined security policy and defines security levels for the data contained within the computer. Before a trusted computer transmits a specified message, the trusted computer checks the trust realm table to verify that both the transmitting and receiving computers are part of at least one common trust realm. If both computers are part of a common trust realm, then the message will be transferred using the appropriate protocol for that trust realm. If the computers are not both members of the trust realm, then the message will not be transmitted. The communication between two trusted computers consists of a message which is transmitted as a protocol data unit which includes a sealed version of the message, authenticated identifies for the sending system and user, the message security level label, and an identifier for the selected trust realm. The transmitted message is then received, processed for validity and if valid, the message is processed within the receiving computer.

U.S. Pat. No. 5,416,842, issued to Aziz on May 16, 1995, discloses a "Method and Apparatus For Key-Management Scheme For Use With Internet Protocols at Site Firewalls". This system consists of separate private networks which communicate over an Internet type connection through firewalls. A private network "I" communicates through a firewall "A" to the Internet where the message is transferred to firewall "B" and then decoded and sent on to another private network "J". This allows private network "I" and private network "J" to communicate in a secure encapsulated message while having firewall protection. The invention begins with a source node "I" sending a data gram to the firewall "A". Firewall "A" has a secret value "SA" and a public value "PA". Similarly, firewall "B" is provided with a secret value "SB" and a public value "PB". In this manner both firewall "A" and firewall "B" can acquire a shared secret value "SAB" without having to communicate. The communication is initiated by providing firewall "A" and firewall "B" with initial values for all other secure firewalls on the network. Firewalls "A" and "B" then use secret value "SAB" to create a key "KAB". The transmitting firewall then generates a random key "KP" which is used to encrypt the received data. The key "KP" and the encrypted data are then all encrypted by the public key "KAB" for transmission over the Internet. Firewall "B" will then use key "KAB" to de-crypt the message for the private key "KP" and de-crypt the data that has been transmitted. In this manner the transmitting firewall can constantly be changing the private key "KP" which increases the security of the system.

The above-described key distribution and encryption systems suffer from the drawbacks of using known communication pathways, having known addresses, and some systems even transfer secure key information over the communication lines.

Hence, there is a need for an improved communication method which allows for encrypted information transfer to dynamic locations without transmitting the keys over the communication line.

Additionally, there remains a need for a mechanism in which to log on to a computer system securely without passing password.

BRIEF SUMMARY OF THE INVENTION

In accordance with the present invention, an improved encoded or encrypted method for transferring information is provided which addresses the drawbacks of the prior art devices.

In accordance with one embodiment of the present invention a message is input to a first device which obtains a dynamic address from a first server to allow for connection to a second server.

A further embodiment of the invention allows for transmitting the message from the first device to the second server, receiving the message at the second server, storing the message until transfer to a second device as requested, and then transmitting the message to the second device from the second server.

Another embodiment of the present invention allows for encoding the message before it is input to the first device, and decoding the message after it has been received at the second device.

Yet another embodiment of the present invention allows for multiple servers which can be contacted to obtain the dynamic address of another server.

A still further embodiment of the present invention uses a remote administrator to control access both to the first server for obtaining the dynamic addresses, and to the second server for message transfers.

In accordance with another embodiment of the present invention, the user access to the secure name server is controlled by a remote administrator which creates, authorizes and deletes valid user ID/password combinations.

In accordance with another example of the present invention, the system allows for an electronic mail transfer between two users where a direct communication between the first user and second user never occurs. In this manner, two users can communicate without actually having a direct connection which is detectable by other parties.

The principal object of the present invention is to provide an easy to use, protected, electronic mail system for communication.

Another object of the present invention is to allow for the establishment of multiple electronic mail servers for different user categories.

A still further object of the present invention is to provide for a system which can communication on both secure and non-secure electronic mail servers.

Yet another object of the present invention is to provide for a program which allows for automatic and immediate deletion of electronic mail messages once they have been sent.

Other objects and further scope of the applicability of the present invention will become apparent from the detailed description to follow, taken in conjunction with the accompanying drawings wherein like parts are designated by like reference numerals.

DETAILED DESCRIPTION OF THE PREFERRED EMBODIMENTS

Figure 1:
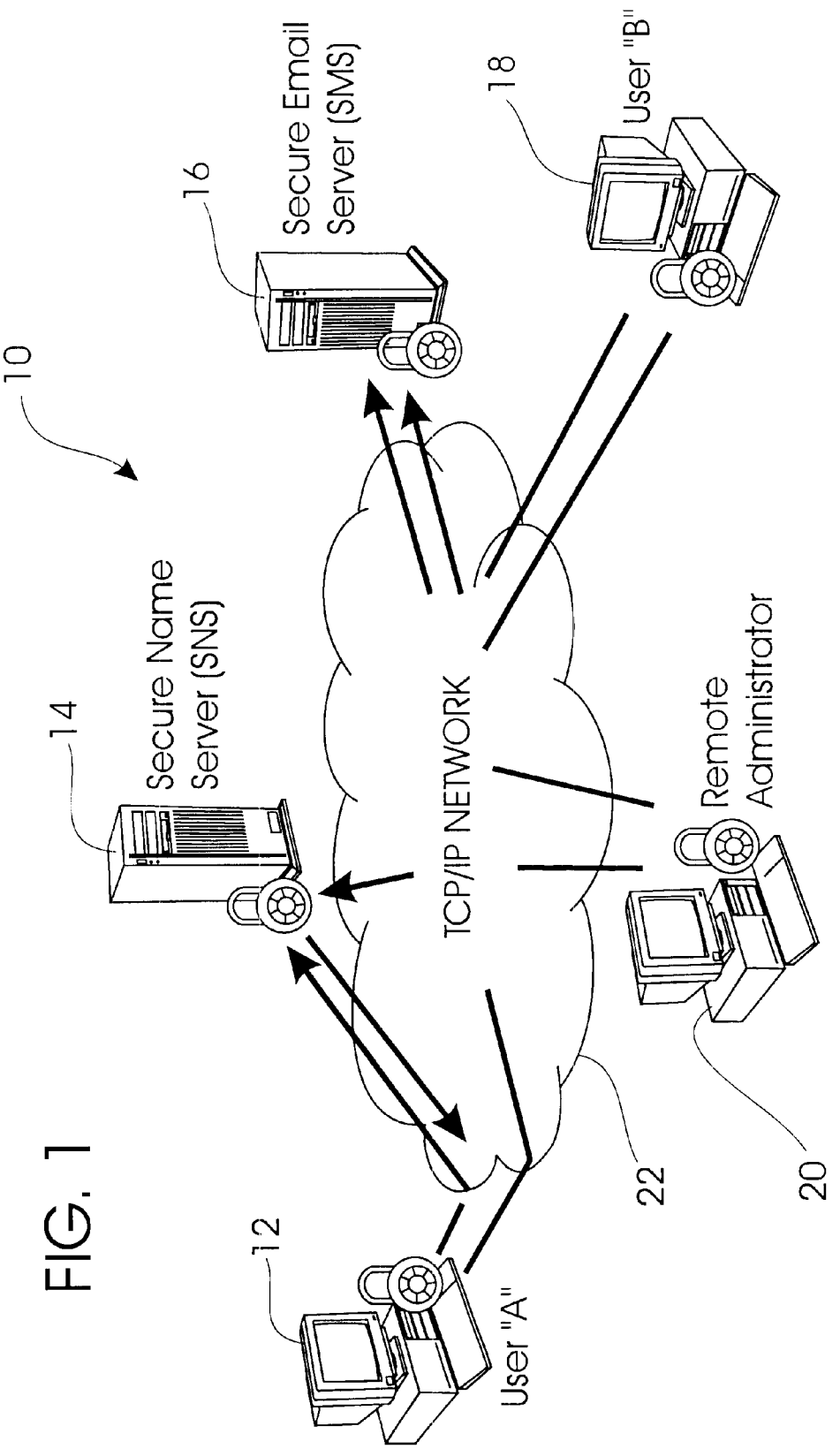
FIG. 1 is a schematic view of a network communication arrangement utilizing a secure electronic mail system of the present invention.

In accordance with one exemplary embodiment of the present invention as shown in FIG. 1, a protected communication network is generally designated by the reference numeral 10.

In the preferred embodiment, the protected communication network 10 consists of a first central processing unit or user 12, a secure name server 14, a secure electronic mail server 16, a second central processing unit or user 18, a remote administrator 20 and a connecting network 22. The general operation of the overall system will be outlined in the following discussion.

Initially, the secure electronic mail server 16 will establish a link to a connecting network 22 and obtain a dynamic address. The dynamic address is standardly assigned by the network to a user of the network. An example of a dynamic address is a dynamic Internet protocol address for communicating over the Internet or world wide web. The secure electronic mail server 16 will then contact the secure name server 14 which has a fixed address on the connecting network 22. The secure electronic mail server 16 will then notify the secure name server 14 of the secure electronic mail server's 16 dynamic address on the connecting network 22. The communication between the secure electronic mail server 16 and the secure name server 14 will then be discontinued.

It will be understood that the present invention will be applicable to various types of networks.

Next, the remote administrator 20 will log on to the connecting network 22 and communicate with the secure name server 14. Note that this communication is a protected communication to allow for a protected information transfer. The secure name server 14 transfers the dynamic address of the secure electronic mail server 16 to the remote administrator 20. The communication between the secure name server 14 and the remote administrator 20 is then discontinued.

In an alternate embodiment, the remote administrator 20 will establish logon protocol for users to access the secure name server 14. The remote administrator 20 will then have the information to pass on to users of the protected communication network 10 to allow them to access the secure name server 14 through their logon protocol. In this manner, access to the secure name server 14 is controlled by the logon protocol, and only users authorized by the remote administrator 20 will be allowed to access the secure name server 14.

After receiving the dynamic address of the secure electronic mail server 16, the remote administrator 20 will initiate a communication with the secure electronic mail server 16 over the network 22. Once again, this is a protected information transfer communication. During this communication, the remote administrator 20 will create, change, and delete authorized user ID/password combinations for accessing the secure electronic mail server 16. The communication between the remote administrator 20 and the secure electronic mail server 16 will then be discontinued.

As different users require access to the system, the remote administrator 20 will provide the appropriate logon protocol and/or authorized ID/password combinations to the users to allow for access to the protected communication network 10. In this example, both the first user 12 and the second user 18 contact the remote administrator 20 for authorized logon protocol and user ID/password combinations.

The first user 12 now wishes to write and send an electronic mail communication to the second user 18 over the protected communication network 10. The first user 12 uses his unique logon protocol combination to access the secure name server 14 over the connecting network 22. Once again, this is a protected communication. The first user 12 then obtains the dynamic address of the secure electronic mail server 16 from the secure name server 14. The communication between the first user 12 and the secure name server 14 is then discontinued.

The first user 12 now uses his ID/password combination and the dynamic address to log onto the secure electronic mail server 16. Once the first user 12 has logged on to the secure electronic mail server 16, the first user's 12 electronic mail message is then protected by a protection method, such as encryption, and sent on the communication network 22 to the designated recipient's box on the secure electronic mail server 16. In this example, the information would be stored in the second user's box. The communication between the first user 12 and secure electronic mail server 16 is then broken.

At random intervals, the second user 18 will use his separate logon protocol to obtain the dynamic address of the electronic mail server 16 from the secure name server 14 and then access the secure electronic mail server 16 with his ID/Password combination to see if 20 there are messages for the second user 18. If there are messages in the second user's box on the secure mail server 16, the secure electronic mail server 16 will notify the second user 18 that there are messages available for retrieval. The secure electronic mail server 16 will then use a protected transfer to send the electronic mail message from the first user 12 to the second user 18 over the connecting network 22. The communication between the second user 18 and the secure electronic mail server 16 is then discontinued. Thus, a message has been transferred from the first user 12 to the second user 18 without a direct connection between the first user 12 and the second user 18.

It will also be understood that, in an alternate arrangement, the secure name server and the secure mail server may reside on the same computer system.

The aforementioned method of communication provides several levels of communication protection against outside interference for unwanted monitoring.

First, the first user 12 and the second user 18 never communicate directly. Thus, an outside person must monitor multiple communication pathways to detect communication between the first user 12 and the second user 18.

Second, because the secure electronic mail server uses a dynamic address, the communication pathways to and from the secure electronic mail server 16 are constantly changing. This increases the difficulty of monitoring communication with the secure electronic mail server 16.

Third, because the dynamic address of the secure electronic mail server 16 must be obtained from the secure name server 14, the address of the secure name server 14 must be known.

Fourth, because the secure name server 14 requires a proper log protocol combination, the dynamic address of the secure electronic mail server 16 is not easily obtained.

Fifth, because the secure name server 14 transfers the dynamic address of the secure electronic mail server 16 in an encrypted message, a first level of encryption must be broken just to obtain the dynamic address for the secure electronic mail server 16.

Sixth, because a communication between a user and the secure mail server 16 is protected, a second level of encryption must be broken to obtain the message.

Seventh, because the users can be using an additional protection or encryption system that is unknown to the secure networks, an additional level of protection can be used between the first user 12 and the second user 18. This additional level must also be broken to obtain the message text.

Eighth, because the entire system is controlled by a remote administrator 20, logon protocols, passwords, and keys can be constantly updated and changed. Any compromised logon protocol or ID/password combinations can be immediately deleted from the system by the remote administrator 20.

In addition, multiple applications of the present system could provide for a system where the communication between the remote administrator 20 and a secure electronic mail server 16 would also be an indirect communication through another electronic mail server 16.

While these descriptions of protection levels illustrate one example of the present invention, it is to be understood that the different levels of protection or additional levels of protection may be implemented in conjunction with the present invention to further enhance security.

The sub-processes for communicating throughout the network include the process to administrate electronic mail accounts, the process to send electronic mail, the process to retrieve mail, the process to register a machine with a secure name server, the process to obtain a dynamic address from alternate secure name servers, the process to get an address from a secure name server, and the process to connect to a secure electronic mail server.

Each of the sub-processes for communicating will be given further detail in the following discussion.

Process to Administrate Electronic Mail Accounts

Figure 2:
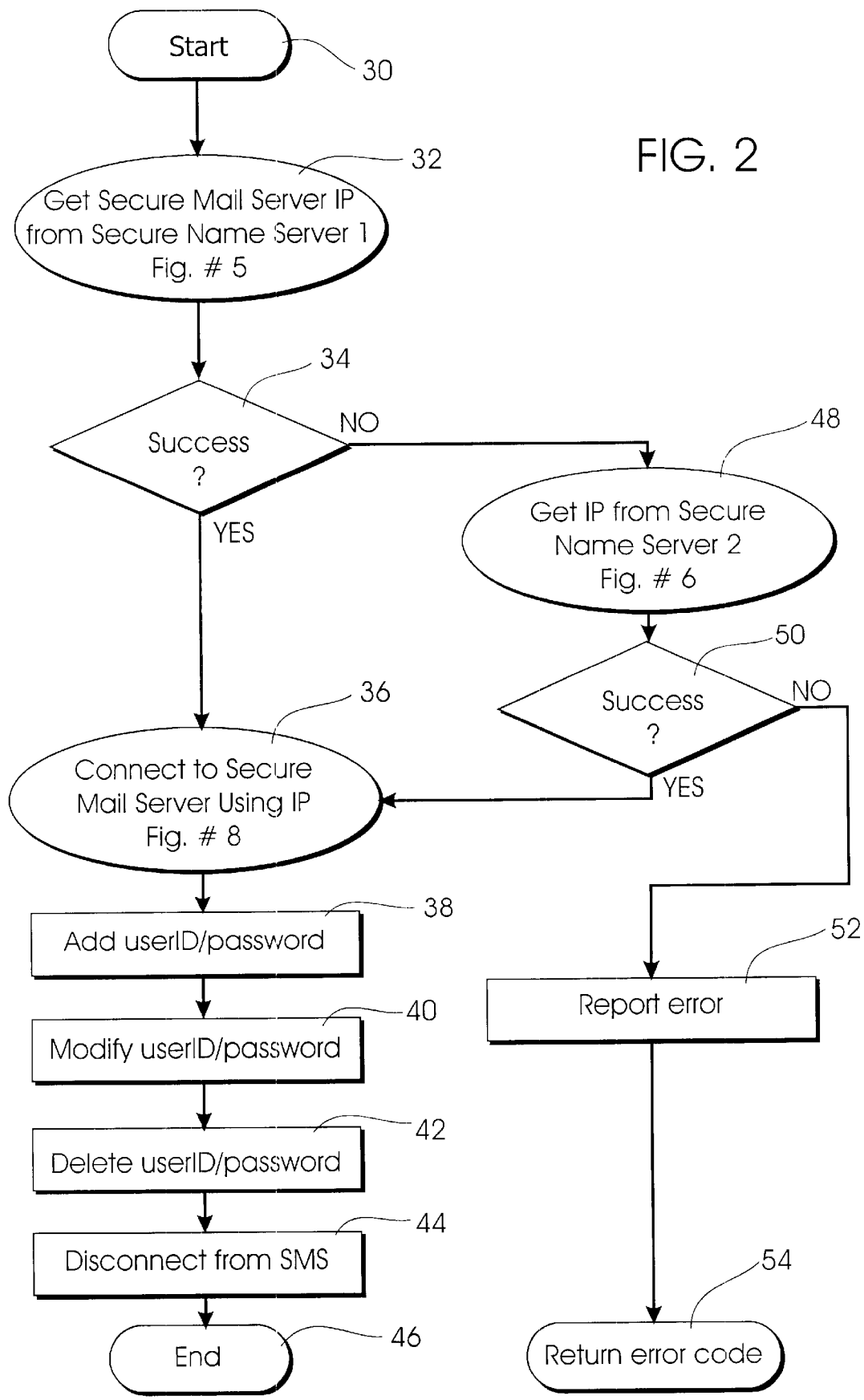
FIG. 2 is a flow chart representation of the process to remotely administrate electronic mail accounts.

FIG. 2 of the drawings outlines the process by which the remote administrator sets up the user ID/password combinations. The process starts 30 by initializing the parameters necessary for operation of the process. The system will then check a first secure name server 32 for the dynamic address of the secure mail server. Block 34 represents the system checking to see it properly obtained the dynamic address of secure mail server from the first secure name server. If the system is successful in obtaining the secure mail server dynamic address from the first secure name server, the system will move on connect to the mail server as shown at block 36.

If the system is not successful in obtaining the dynamic address of the secure mail server from the first name server as shown in block 34, the system will move on to attempt to obtain the dynamic address of the secure mail server from the second secure name server, as shown in block 48. As shown in block 50, the system will check to see if it has now successfully retrieved the secure mail server dynamic address from the second secure name server. If the system is successful then the system will move on to connect to the secure mail server as shown in block 36. If the system has not successfully obtained the dynamic address of the secure mail server from either the first name server or the second secure name server the system will send back a report error as shown in block 52 and return an error code to the user as shown in block 54.

If the system has successfully obtained the dynamic address of the secure mail server, it will connect to the secure mail server using the dynamic address as shown in block 36. The remote administrator will then be able to add user ID/passwords as shown in block 38, modify user ID/passwords as shown in block 40, and delete user ID/passwords as shown in block 42. The remote administrator will then disconnect from the secure mail server as shown in block 44. The system will then end the process to remotely administrate as shown in block 46.

A similar process could be adapted to change the logon protocol for the secure name servers.

Process Used to Send Electronic Mail

Figure 3:
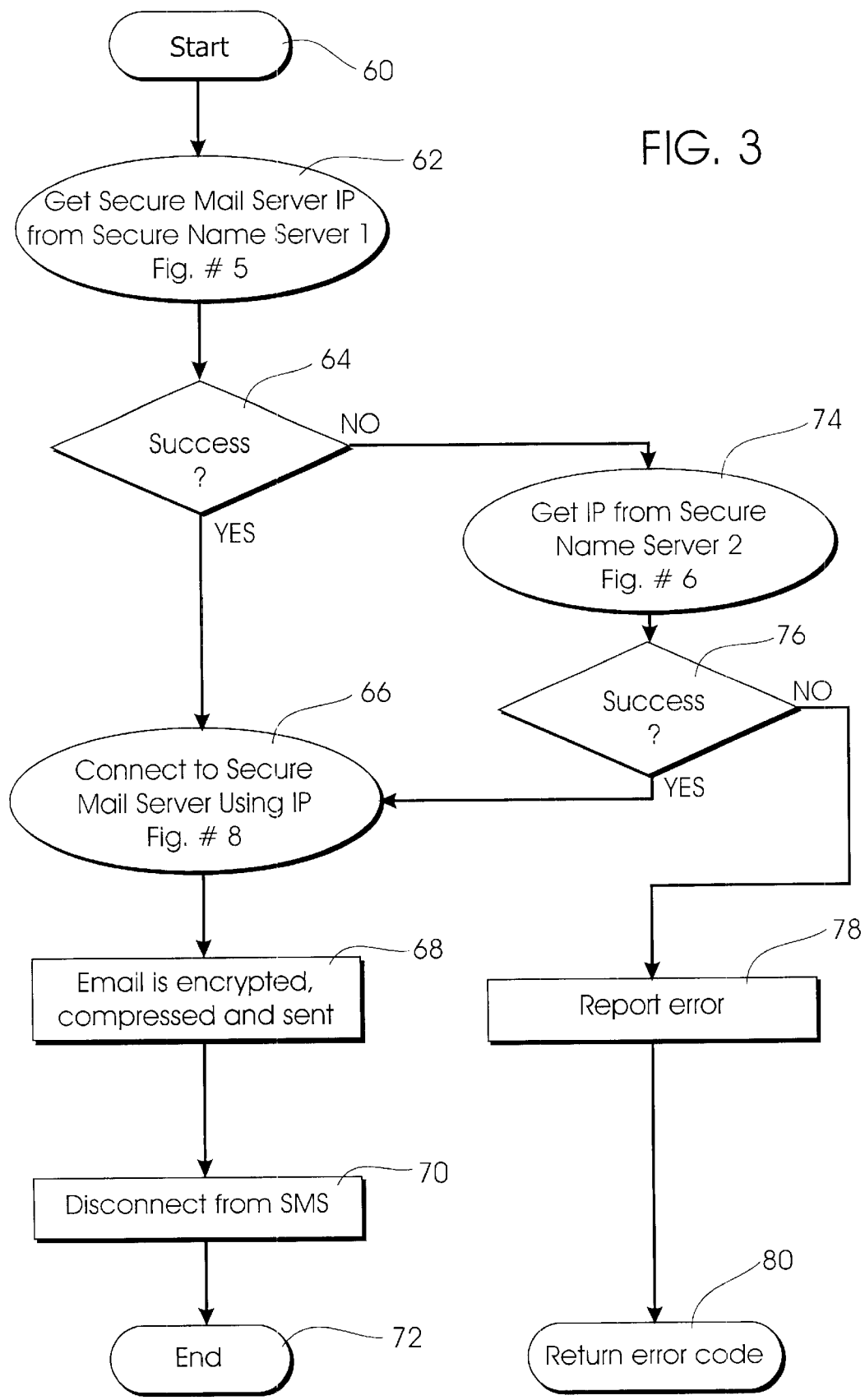
FIG. 3 is a flow chart representation of the process used to send mail.

FIG. 3 of the drawings outlines the process by which the secure electronic mail programs send mail communications. The process will start 60 by initializing the parameters necessary for operation of the process. The user will then use his logon protocol to check a first secure name server 62 for the dynamic address of the secure mail server. Block 64 represents checking to see it properly obtained the dynamic address of secure mail server 20 from the first secure name server. If the user is successful in obtaining the secure mail server dynamic address from the first secure name server, the user will move on connect to the mail server at block 66.

If the system is not successful in obtaining the dynamic address of the secure mail server from the first name server as shown in block 64, the system will move on to get the dynamic address of the secure mail server from the second secure name server, as shown in block 74. As shown in block 76, the user will check to see if it has now successfully retrieved the secure mail server dynamic address from the second secure name server. If the user is successful, then the user will move on to connect to the secure mail server as shown in block 66. If the user has not successfully obtained the dynamic address of the secure mail server from either the first name server or the second secure name server, the user will send back the report error as shown in block 78 and return the error code to the operator as shown in block 80.

If the user has successfully used its logon protocol to obtain the dynamic address of the secure electronic mail server, it will connect to the secure mail server using the dynamic address as shown in block 66.

Once the user has successfully connected to the electronic mail server, the electronic mail is protected and sent to the electronic mail server as shown at block 68. The user then disconnects from the secure electronic mail server as shown at block 70, and ends the process as shown at block 72.

Process Used to Retrieve Mail

Figure 4:
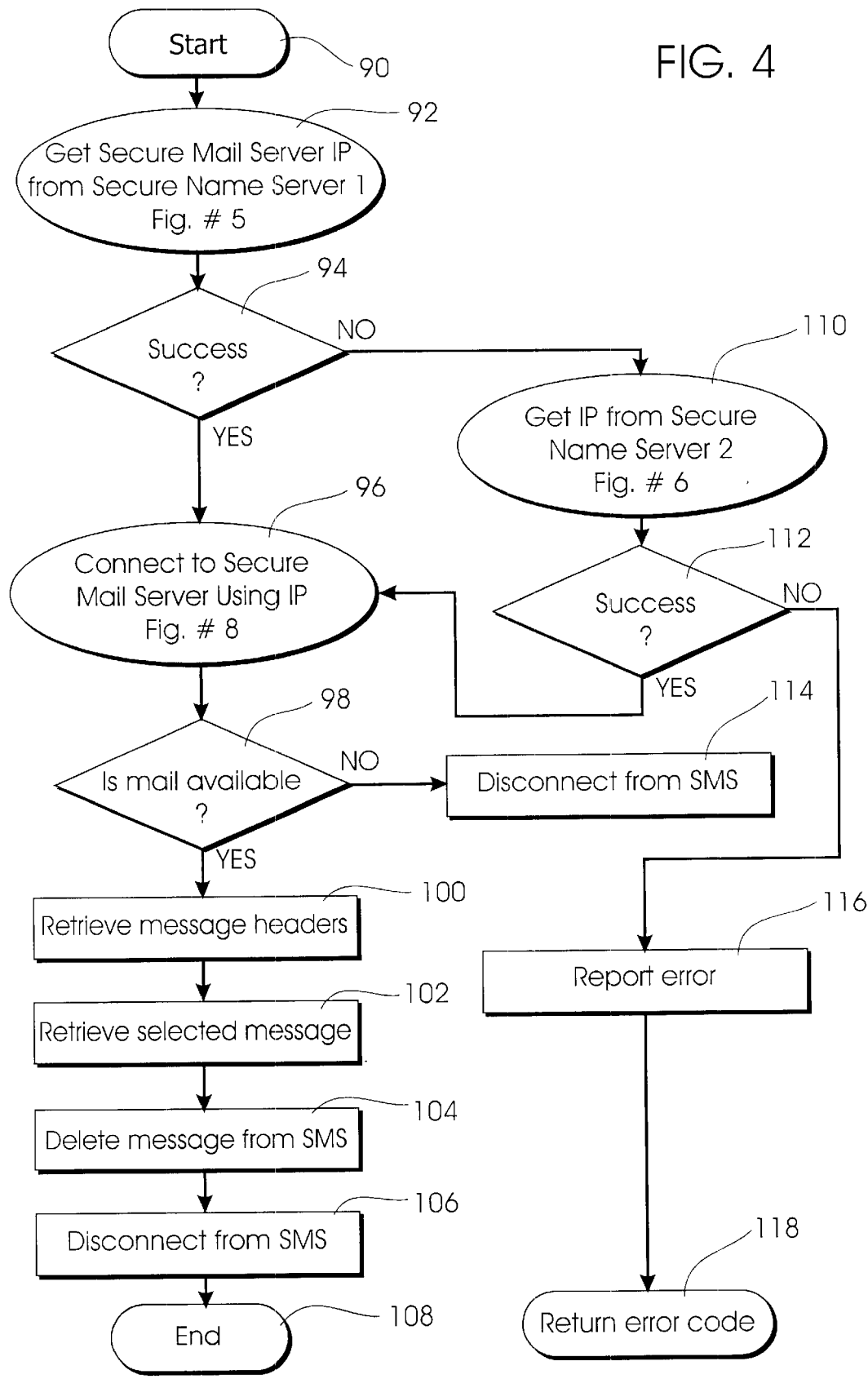
FIG. 4 is a flow chart representation of a process used to retrieve mail.

FIG. 4 of the drawings outlines the process by which a user retrieves mail from the secure mail server. The process will start 90 by initializing the parameters necessary for operation of the process. The user will use its logon protocol to check a first secure name server 92 for the dynamic address of the secure mail server. Block 94 represents the user checking to see it properly obtained the dynamic address of secure mail server from the first secure name server. If the user is successful in obtaining the secure mail server dynamic address from the first secure name server, the user will move on connect to the mail server at block 96.

If the user is not successful in obtaining the dynamic address of the secure mail server from the first name server as shown in block 94, the user will move on to get the dynamic address of the secure mail server from the second secure name server, as shown in block 110. As shown in block 112, the user will check to see if it has now successfully retrieved the secure mail server dynamic address from the second secure name server. If the user is successful, then the system will move on to connect to the secure mail server as shown in block 96. If the system has not successfully obtained the dynamic address of the secure mail server from either the first name server or the second secure name server, the user will send back the report error as shown in block 116 and return the error code to the user as shown in block 118.

Once the user or retrieval program has properly connected to the electronic mail server, the electronic mail program will check to see if mail is available as shown in block 98.

If mail is available in block 98, then the retrieval program will retrieve the message headers as shown in block 100, retrieve the selected message as shown in block 102, delete the message from the secure mail server as shown in block 104, and disconnect from the secure electronic mail server as shown in block 106. The retrieval program will then restore the necessary parameters to properly end this process as shown in block 108.

If it is detected in block 98 that mail is not available, the retrieval program will disconnect from the secure mail server as shown in block 114.

Process to Register Machine with a Secure Name Server

Figure 5:
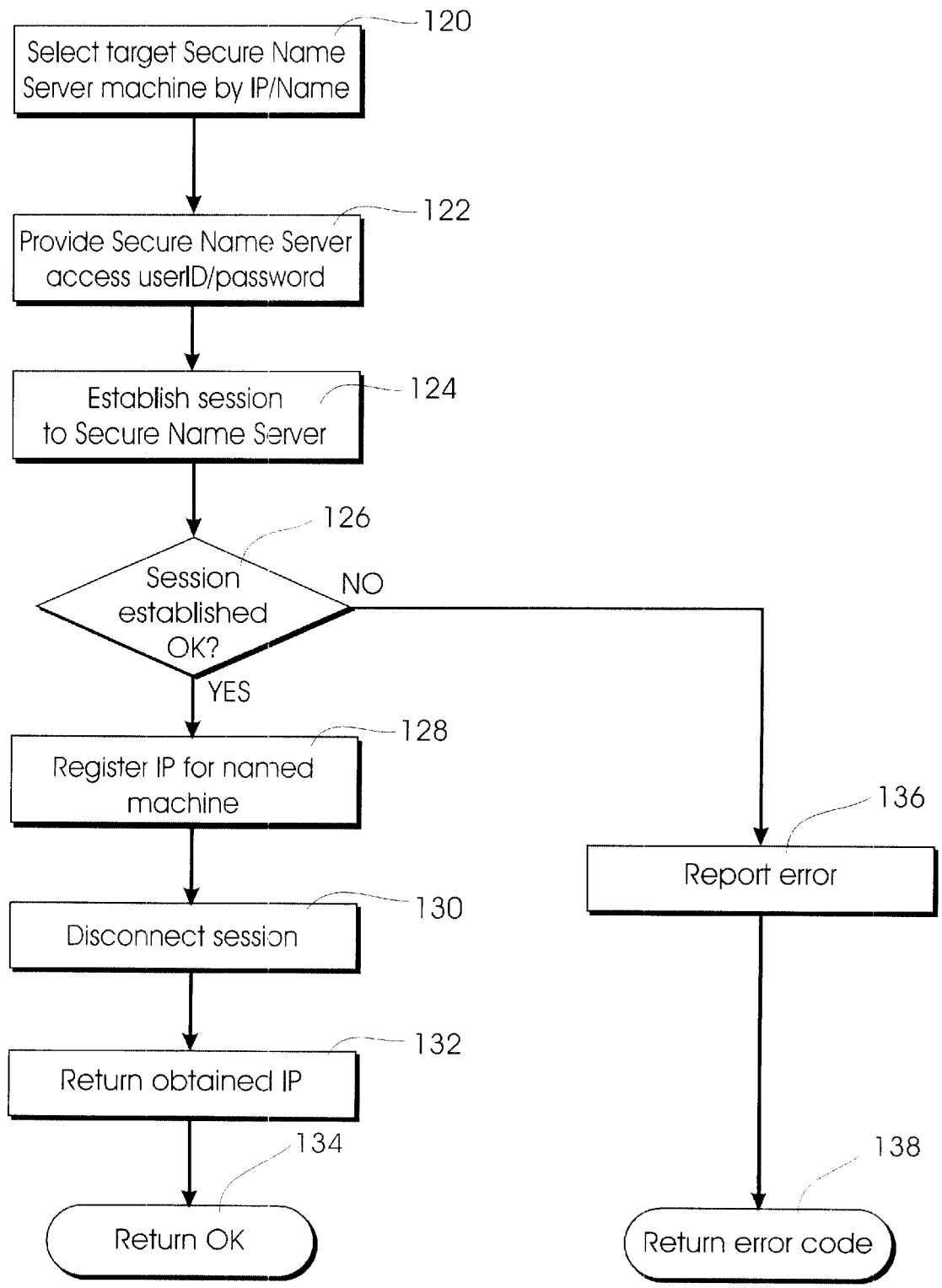
FIG. 5 is a flow chart representation of a process to register a machine with a secure name server.
Figure 6:
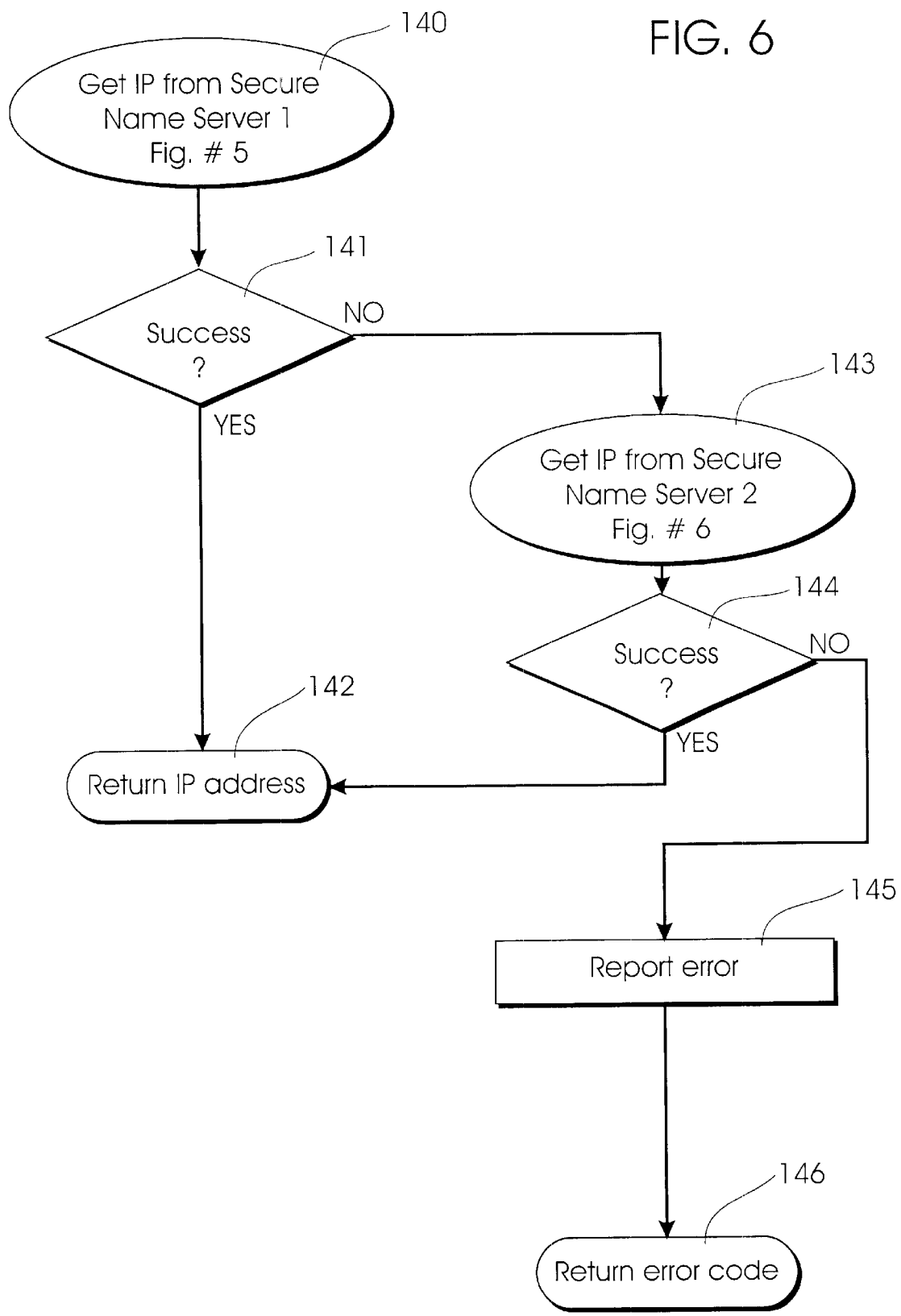
FIG. 6 is a flow chart representation of a process for obtaining an IP address from alternate secure name servers.

As shown in FIG. 5, when a user, administrator, or secure electronic mail server logs onto the system with a dynamic address, the secure name server is contacted. The process for establishing this connection and supplying the proper dynamic address to the secure name server is outlined as follows.

As shown in block 120, the registering CPU machine selects an appropriate secure name server to be contacted. The registering machine then supplies the secure name server with these proper logon protocol combination as shown in block 122. As shown in block 124, a session with a secure name server is then established. If the session is successfully established as shown in block 126, then the machine will go on to register the dynamic address for the named machine 128, disconnect the session 130, and then properly shut down this process as shown in block 134.

If the session was not properly established in block 126, then the machine will report an error to the user or operator at block 136, and return an error code as shown in block 138.

Process to Obtain a Dynamic Address from Alternate Secure Name Servers

FIG. 2 of the drawings outlines the process by which a network user obtains a dynamic address from multiple secure name servers. The network user will use his logon protocol to check a first secure name server 140 for the dynamic address of the secure mail server. Block 141 represents the user checking to see it properly obtained the dynamic address of secure mail server from the first secure name server. If the user is successful in obtaining the secure mail server dynamic address from the first secure name server, the system will return the dynamic address to the user program as shown at block 142.

If the user is not successful in obtaining the dynamic address of the secure mail server from the first name server as shown in block 141, the user will move on to get the dynamic address of the secure mail server, from the second secure name server, as shown in block 143. As shown in block 144, the user will use its logon protocol to check to see if it has now successfully retrieved the secure mail server dynamic address from the second secure name server. If the user is successful then the system will return the dynamic address to the user program as shown in block 142. If the user has not successfully obtained the dynamic address of the secure mail server from either the first name server or the second secure name server, the system will send back the report error as shown in block 145 and return the error code to the user as shown in block 146.

Process to Get an Address from a Secure Name Server

Figure 7:
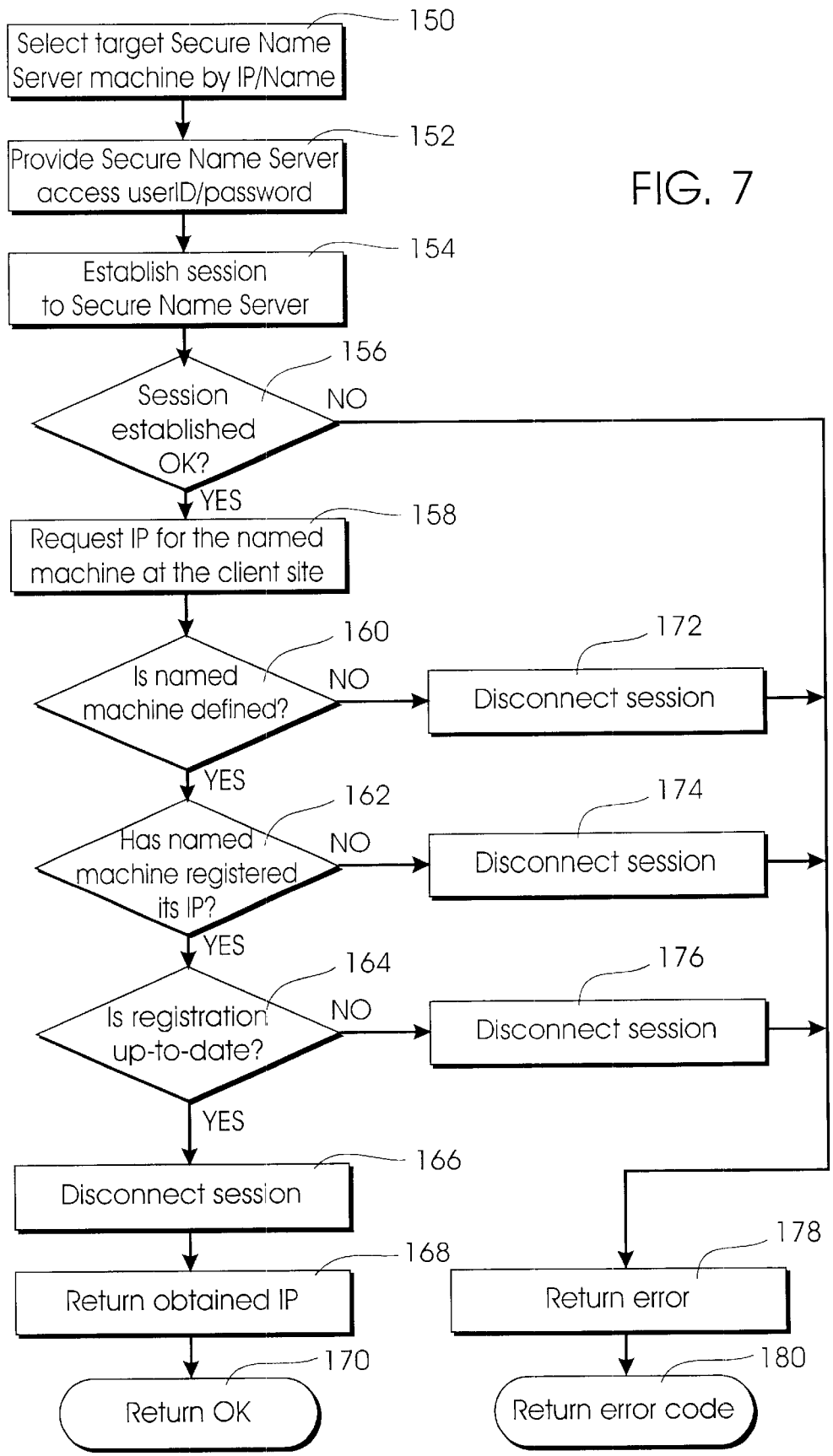
FIG. 7 is a flow chart representation of a process to get an IP address from a particular secure name server.

FIG. 7 of the drawings outlines the process by which an unknown address, such as the dynamic address of a secure mail server, is obtained from a secure name server. The process starts by selecting the target secure name server machine by its fixed address/name as shown in block 150. The user then provides the secure name server with its logon protocol combination as shown at block 152. If the user logon combination is verified then a session is established with a secure name server as shown at block 154. As shown at block 156, if the session has not been correctly established then the secure name server will report an error code as shown at block 178 and return the error code to the user as shown at block 180.

Returning to block 156, if the session has been correctly established as shown at block 156, then the user will be allowed to request the address for the named machine at the client site as shown at block 158.

The system will then perform a series of checks to see if the named machine has been properly identified. If the named machine has not been properly identified, shown at block 160, then the system will be disconnected as shown at block 172, move on to reporting the error code as shown at block 178, and continue processing.

If the named machine has been properly defined as shown at block 160, then the system will check to see if the named machine has properly registered its address shown at block 162. If the address has not been correctly registered, then the system will move on to disconnect session as shown at block 174, report the error code as shown at block 178, and continue processing. If the named machine has properly registered its address as shown at block 162, then the machine will check to see if the registration is up to date as shown at block 164.

If the registration is not properly up to date as shown at block 164, then the system will disconnect the session as shown at block 176, move on to report the error code as shown at block 178, and continue processing.

If the system registration has been properly updated as shown at block 164, then the system will return the obtained address as shown in block 168 and disconnect the session as shown in block 166. The system will then end processing as shown at block 170.

Process to Connect to Secure Electronic Mail Server

Figure 8:
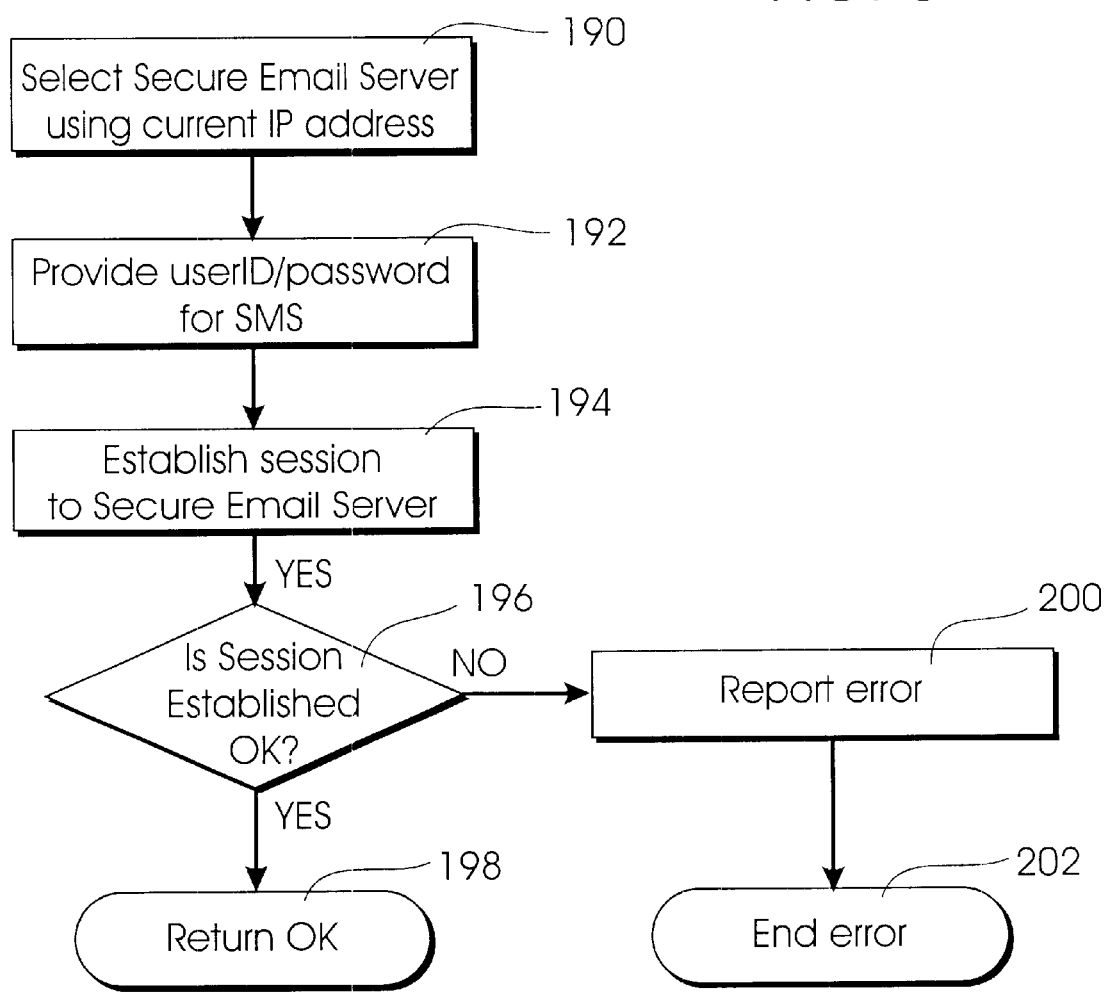
FIG. 8 is a flow chart representation of a connection process to a secure electronic mail server.

FIG. 8 of the drawings outlines the process by which a connection to a secure electronic mail server is made. The process begins by the user selecting the secure electronic mail server using the current dynamic address as shown at block 190. The user will then provide the user ID/password combination for the target secure mail server as shown at block 192. The user will then attempt to establish a session with secure electronic mail server as shown at block 194. The system will check to make sure that the session has been correctly established as shown at block 196.

If the session has been correctly established as shown at block 196, then the system will return to processing as shown at block 198 and allow the user to continue.

If the communication session has not been correctly established as shown at block 196, then the system will report an error as shown at block 200 and forward the error back to the user as shown at block 202.

The preferred embodiment of the present invention uses multiple secured name servers to allow for access to the secure mail server. However, it is also envisioned that a single secure name server or additional secure name servers could be used with this invention. It is also envisioned that the secure name server and the secure mail server could reside on the same machine. In this manner, two separate communication lines would be necessary to allow for the fixed address of the secure name server while providing for a dynamic address of the secure mail server.

It is also envisioned that the logon combination and user ID/password combination could be identical.

While the foregoing detailed description has described several embodiments of the secure electronic mail system in accordance with this invention, it is to be understood that the above description is illustrative and not limiting of the disclosed invention.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A method for transferring messages on a computer network, comprising:

encoding a message;

inputting said message to be transmitted at a first device;

encrypting said message at said first device;

retrieving an address for a dynamically addressed mail server by contacting a first secure name server separate from said mail server using a unique combination ID/password to retrieve said dynamic address;

connecting said first device to said mail server using said server dynamic address;

transmitting said encrypted message from said first device to said mail server;

receiving said message at said mail server;

transmitting said message from said mail server to a second device;

decrypting said message at said second device; and decoding said message.

2. The method of claim 1, wherein obtaining an address for the dynamically addressed mail server further comprises:

contacting a second name server upon a failure to obtain the address from said first secure name server.

3. The method of claim 1, further comprising:

automatically deleting the message after transmitting the message from said dynamically addressed mail server.

4. A method for transferring messages on a computer network, comprising:

establishing a link between an electronic mail server and a network;

retrieving a dynamic address for said electronic mail server from a separate secure name server using a unique combination ID/password;

establish a communication with said electronic mail server across said network;

notifying said secure name server of said dynamic address of said electronic mail server; and thereafter discontinuing said communication between said electronic mail server and said secure name server.

5. The method for transferring messages on a computer network of claim 4, further comprising:

establishing communication between a remote administrator and said secure name server on said network;

transferring said dynamic address of said electronic mail server from said secure name server to said remote administrator;

discontinuing said communication between said secure name server and said remote administrator.

6. The method for transferring messages on a computer network of claim 5, further comprising:

establishing a communication between said remote administrator and said secure electronic mail server across said network;

updating ID/password combinations for accessing said secure electronic mail server;

discontinuing said communication between said remote administrator and said secure electronic mail server.

7. The method of claim 6, further comprising:

distributing said ID/password combinations to users of said network.

8. The method of claim 7, further comprising:

establishing a communication between a first user and said secure name server using a first unique ID/password combination;

transmitting said dynamic address of said secure electronic mail server to said first user from said secure name server;

discontinuing said communication between said first user and said secure name server.

9. The method of claim 8, further comprising:

establishing a connection between said first user and said secure electronic mail server;

encrypting a message from said first user;

transferring said message from said first user to said secure electronic mail server across said network;

discontinuing the communication between said first user and said secure electronic mail server.

10. The method of claim 9, further comprising:

monitoring said secure electronic mail server by a second user;

notifying said second user that a message is waiting for said second user;

transferring said message from said secure electronic mail server to said second user;

discontinuing said connection between said second user and said electronic mail server.

11. A method for transferring messages on a computer network, comprising:

establishing a link between an electronic mail server and a network;

retrieving a dynamic address for said electronic mail server from a separate secure name server using a unique combination ID/password;

establishing a communication with said electronic mail server across said network;

notifying said secure name server of said dynamic address of said electronic mail server;

thereafter discontinuing said communication between said electronic mail server and said secure name server;

establishing a communication between a first user and said secure name server using a first unique combination ID/password;

transmitting said dynamic address of said secure electronic mail server to said first user from said secure name server; and discontinuing said communication between said first user and said secure name server.

* * * * *